United States Patent
Kamamura et al.

(10) Patent No.: US 6,494,807 B1
(45) Date of Patent: Dec. 17, 2002

(54) TRUNNION FOR HALF-TOROIDAL-TYPE CONTINUOUSLY VARIABLE TRANSMISSION AND METHOD FOR WORKING THE SAME

(75) Inventors: Yuko Kamamura, Saitama (JP); Shoji Horike, Kanagawa (JP); Takaji Iwasawa, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/635,006

(22) Filed: Aug. 8, 2000

(51) Int. Cl.⁷ ............................................. F16H 15/38
(52) U.S. Cl. ..................................... 476/46; 476/40
(58) Field of Search ........................... 476/40, 41, 42, 476/46

(56) References Cited

U.S. PATENT DOCUMENTS 5,607,372 A * 3/1997 Lohr ............................ 475/216
5,720,689 A 2/1998 Imanishi et al. ............... 476/40
5,951,435 A 9/1999 Imanishi et al. ............... 476/46

FOREIGN PATENT DOCUMENTS

| JP | 62-71465 | 5/1987 |
|----|----------|--------|
| JP | 7-248049 | 9/1995 |
| JP | 8-47740 | 2/1996 |
| JP | 8-47822 | 2/1996 |
| JP | 8-47823 | 2/1996 |
| JP | 8-240251 | 9/1996 |
| JP | 11-201250 | 7/1999 |

* cited by examiner

*Primary Examiner*—William C Joyce
(74) *Attorney, Agent, or Firm*—Sughrue Mion, PLLC

(57) ABSTRACT

While rotating a spindle 34, the circular hole 15 is worked using a cutting tool 39. Before or after the working operation of the circular hole 15, a chuck 36 is translated in a direction perpendicular to the rotation center axis of the spindle 34 by a slider 35. And, the flat surface 29 as well as the stepped surfaces 31, 31 and inner surfaces 38, 38, which are respectively composed of partially tubular surfaces, are cut or worked.

6 Claims, 10 Drawing Sheets

TRUNNION FOR HALF-TOROIDAL-TYPE CONTINUOUSLY VARIABLE TRANSMISSION AND METHOD FOR WORKING THE SAME

BACKGROUND OF THE INVENTION

1. Field of the Invention

The present invention relates to a half-toroidal-type continuously variable transmission which can be used, for example, as a transmission unit for a car transmission or a transmission for various kinds of industrial machines. Especially, the invention relates to a trunnion to be incorporated into such half-toroidal-type continuously variable transmission, and a method for working such trunnion with ease.

2. Description of the Related Art

Figure 7:
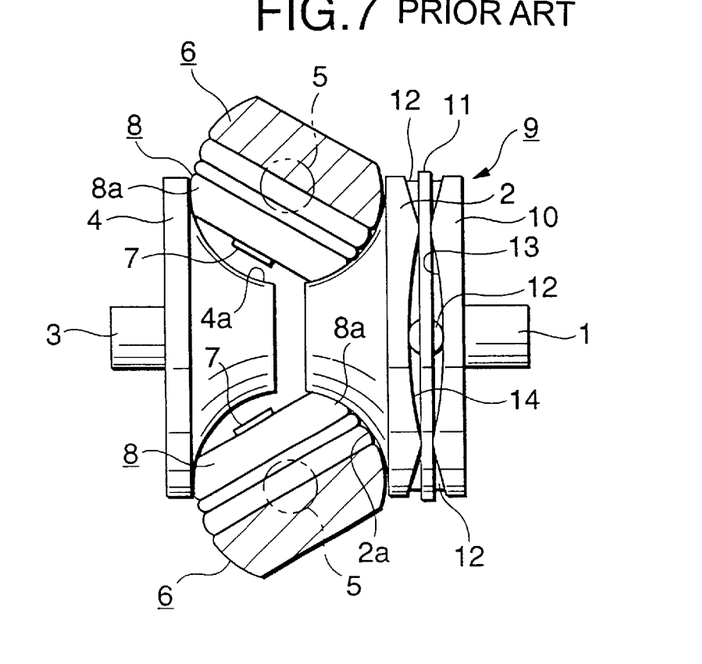
FIG. 7 is a side view of the basic structure of a conventionally known half-toroidal-type continuously variable transmission, showing the state of the maximum speed decreasing operation thereof.
Figure 8:
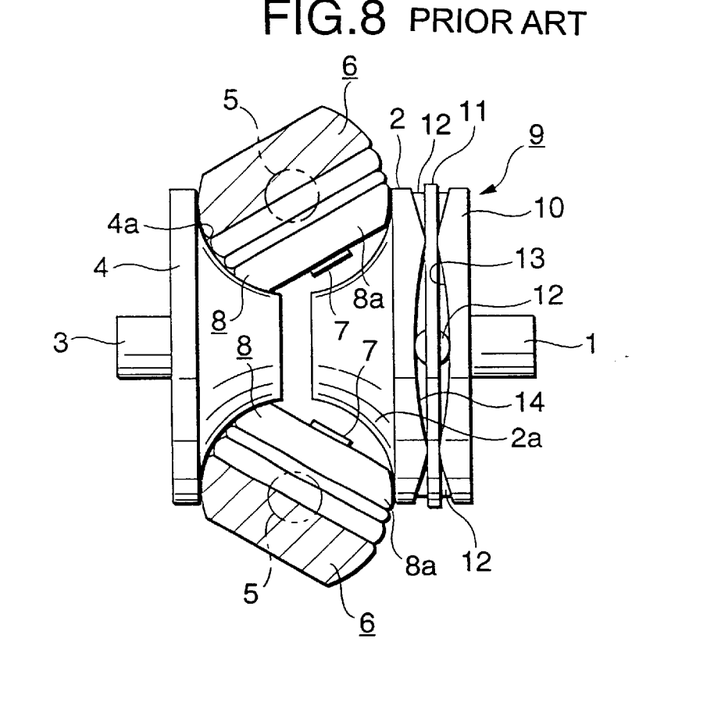
FIG. 8 is a side view of the basic structure of the conventionally known half-toroidal-type continuously variable transmission, showing the state of the maximum speed increasing operation thereof.

Conventionally, it has been studied to use such a half-toroidal-type continuously variable transmission as schematically shown in FIGS. 7 and 8, for example, as a transmission unit for a car transmission. In the conventional half-toroidal-type continuously variable transmission, for example, as disclosed in JP-A-62-71465U, an input side disk 2 is supported concentrically with an input shaft 1, while an output side disk 4 is fixed to the end portion of an output shaft 3 disposed concentrically with the input shaft 1. In the interior portion of a casing in which the half-toroidal-type continuously variable transmission is stored, there are disposed trunnions 6, 6 swingable about their respective pivot shafts 5, 5 which are set at torsional positions with respect to the input and output shafts 1 and 3. That is, the center axes of the pivot shafts 5, 5 do not intersect with the center axes of the input and output shafts 1 and 3 but they are respectively present in the directions that are perpendicular to the directions of the center axes of the input and output shafts 1 and 3.

In the trunnions 6, 6, the pivot shafts 5, 5 are arranged on the outer surfaces of the two end portions thereof in such a manner that they are concentric with each other. The base end portions of displacement shafts 7, 7 are supported on the respective central portions of the trunnions 6, 6 and, by swinging the trunnions 6, 6 about their respective pivot shafts 5, 5, the inclination angles of the displacement shafts 7, 7 can be freely adjusted. On the peripheries of the displacement shafts 7, 7 respectively supported on the trunnions 6, 6, there are rotatably supported a plurality of power rollers 8, 8. And, the plurality of power rollers 8, 8 are respectively held by and between the input side and output side disks 2, 4. The two disks 2, 4 respectively include inner surfaces 2a, 4a which are disposed such that they are opposed to each other. The mutually opposed inner surfaces 2a, 4a each have a cross section formed as a concave surface which can be obtained by rotating an arc with the pivot shaft 5 as the center thereof. On the other hand, the power rollers 8, 8 respectively have peripheral surfaces 8a, 8a each of which is formed as a spherically convex surface. And, the peripheral surfaces 8a, 8a are respectively contacted with the inner surfaces 2a, 4a.

Between the input shaft 1 and input side disk 2, there is interposed a pressure device 9 such as a loading cam. Thus, the input side disk 2 can be elastically pushed toward the output side disk 4 by the pressure device 9. The pressure device 9 comprises a cam plate 10 rotatable together with the input shaft 1, and a plurality of rollers 12, 12 (for example, four rollers) which are respectively held by a retainer 11. On one side surface (in FIGS. 7 and 8, the left side surface) of the cam plate 10, there is formed a cam surface 13 which consists of a curved surface extending in the circumferential direction of the cam plate 10; and, on the outer surface (in FIGS. 7 and 8, the right side surface) of the input side disk 2 as well, there is formed a cam surface 14 which is similar to the cam surface 13. And, the plurality of rollers 12, 12 are rotatably supported about their respective axes extending in the radial direction with respect to the center of the input shaft 1.

When the above-structured half-toroidal-type continuously variable transmission is in operation, in case where the cam plate 10 is rotated due to the rotation of the input shaft 1, the plurality of rollers 12, 12 are respectively pressed against the cam surface 14 formed on the outer surface of the input side disk 2 by the cam surface 13 of the cam plate 10. As a result of this, the input side disk 2 is pressed against the plurality of power rollers 8, 8 and, at the same time, the pair of cam surfaces 13, 14 and the plurality of rollers 12, 12 are pressed against each other, thereby causing the input side disk 2 to be rotated. And, the rotation of the input side disk 2 is transmitted to the output side disk 4 through the plurality of power rollers 8, 8, with the result that the output shaft 3 fixed to the output side disk 4 can be rotated.

Of cases in which the rotation speed between the input shaft 1 and output shaft 3 is to be changed, at first, in case where deceleration is carried out between the input shaft 1 and output shaft 3, the trunnions 6, 6 are swung about their respective pivot shafts 5, 5, and the displacement shafts 7, 7 are inclined in such a manner that the peripheral surfaces 8a, 8a of the power rollers 8, 8, as shown in FIG. 7, can be respectively contacted with the near-center portion of the inner surface 2a of the input side disk 2 and with the near-outer-periphery portion of the inner surface 4a of the output side disk 4. On the other hand, in the case of acceleration, the trunnions 6, 6 are swung about their respective pivot shafts 5, 5, and the displacement shafts 7, 7 are inclined in such a manner that the peripheral surfaces 8a, 8a of the power rollers 8, 8, as shown in FIG. 8, can be respectively contacted with the near-outer-periphery portion of the inner surface 2a of the input side disk 2 and with the near-center portion of the inner surface 4a of the output side disk 4. In case where the inclination angles of the displacement shafts 7, 7 are set in the middle of the inclination angles in FIGS. 7 and 8, there can be obtained a middle transmission ratio.

Figure 9:
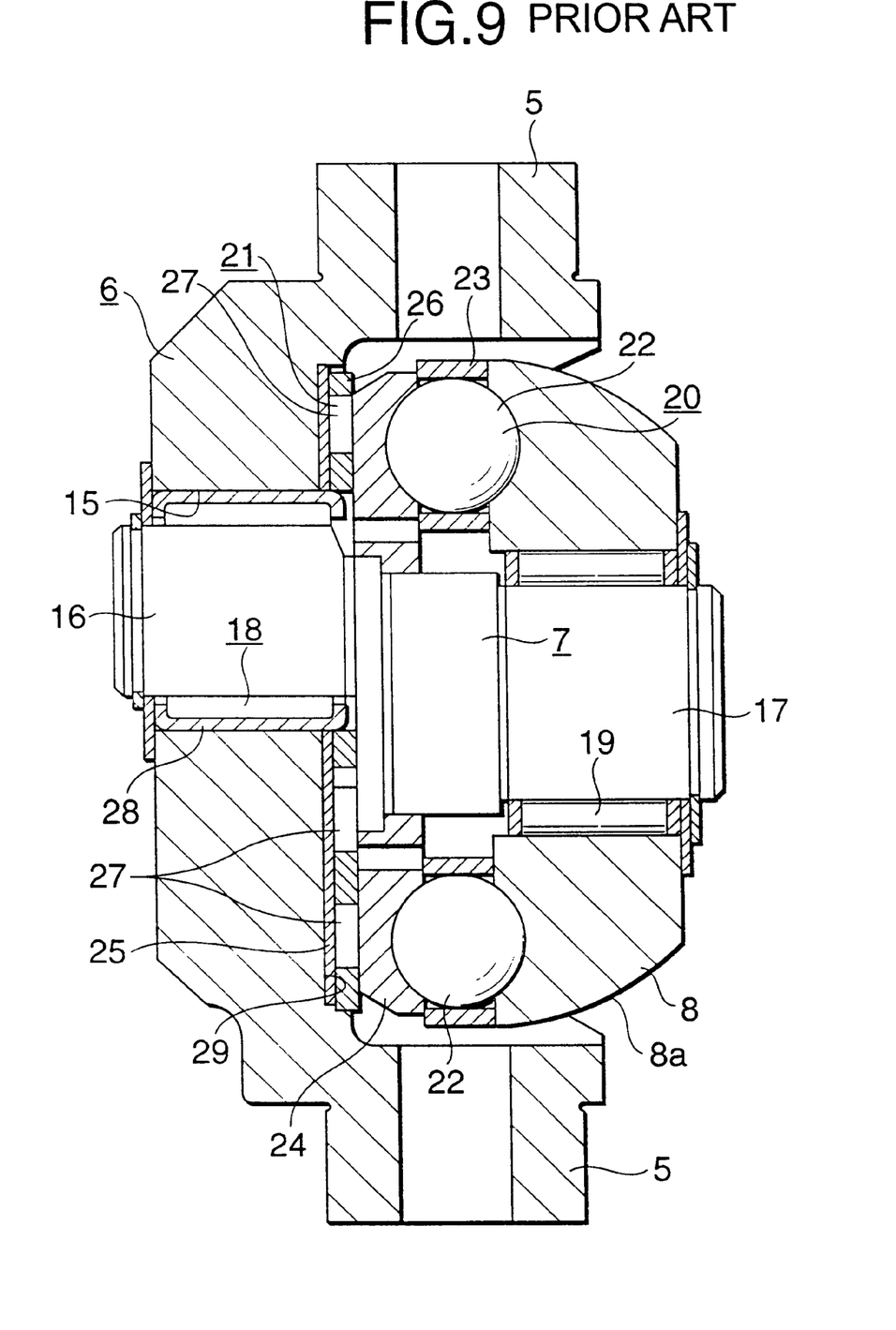
FIG. 9 is a section view of a conventional structure, showing a state thereof in which a power roller is assembled to a trunnion.
Figure 10:
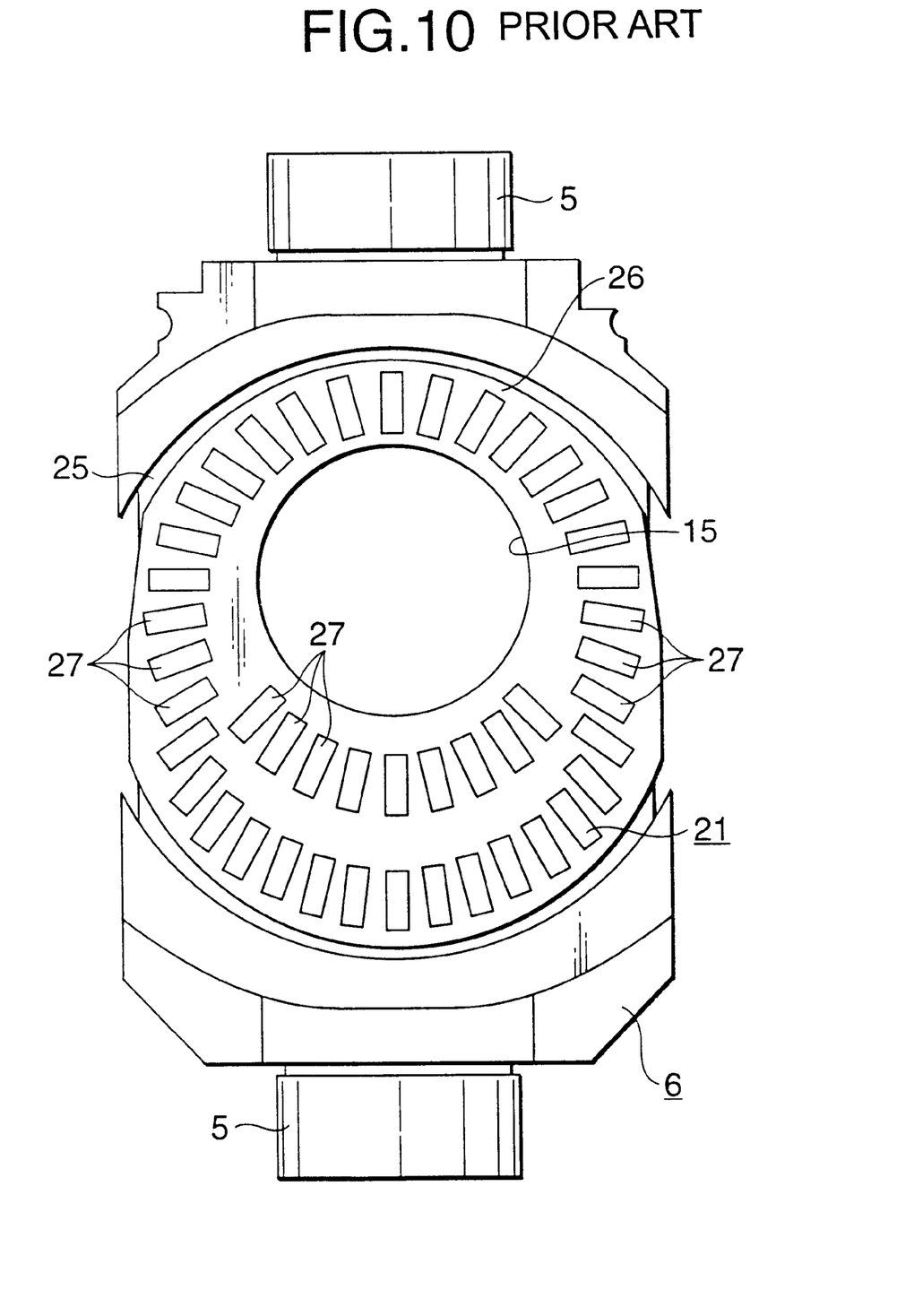
FIG. 10 is a view of the above conventional structure when it is viewed from the right of FIG. 9, with the power roller and thrust ball bearing removed therefrom; and, FIG. 11 is a view of the above conventional structure when it is viewed from the right of FIG. 10, with a thrust needle roller bearing removed further from FIG. 10.
Figure 11:
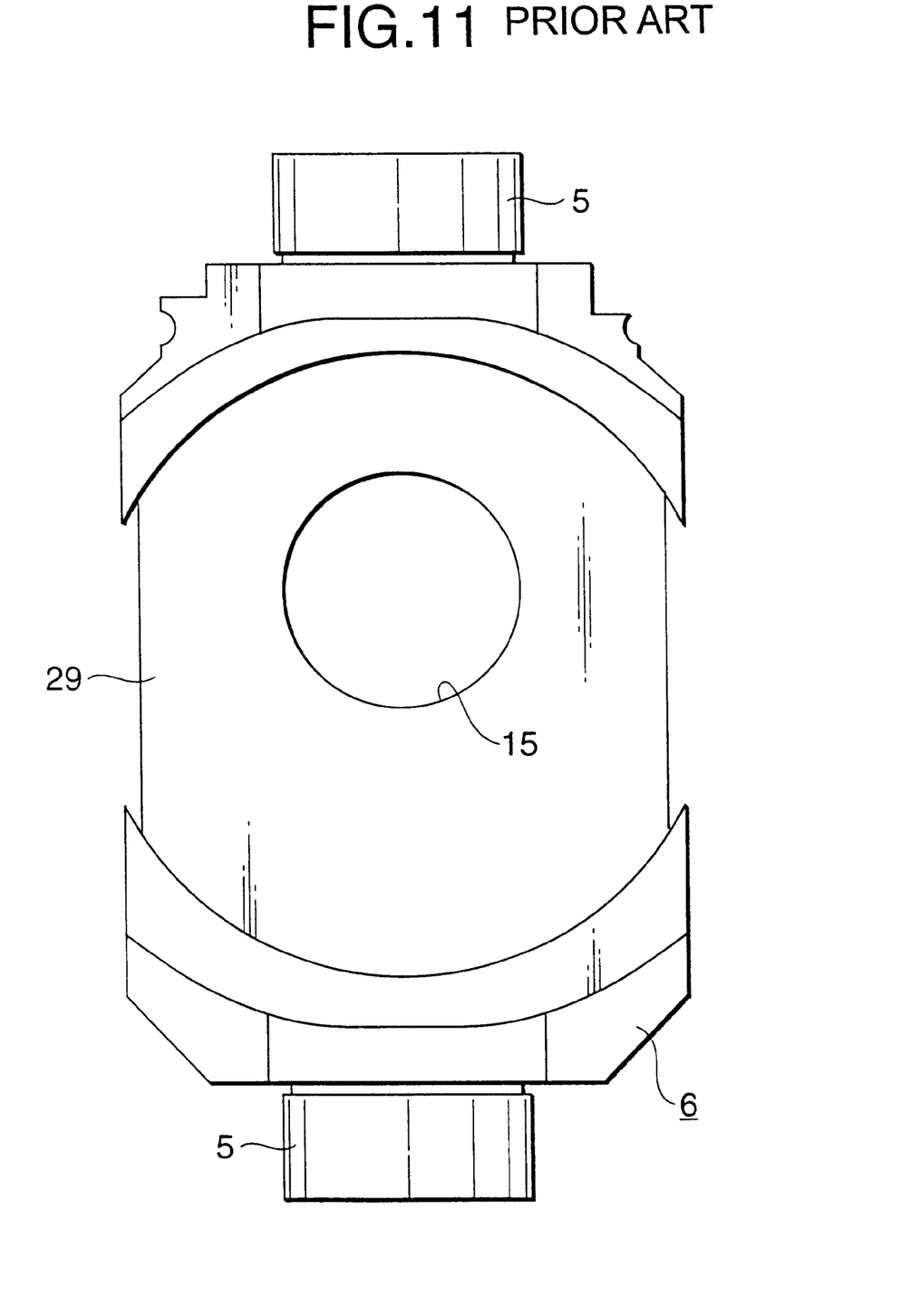

The specific shapes of the trunnions 6, 6 as well as the structures of portions for supporting the power rollers 8, 8 on the trunnions 6, 6 are conventionally known; that is, they are disclosed, for example, in JP-A-8-240251. Now, FIGS. 9 to 11 shows a conventional structure of a portion for supporting the power roller 8 on the trunnion 6. In the middle portion of the trunnion 6, there is formed a circular hole 15. The circular hole 15 is formed in a direction perpendicular to the pivot shafts 5, 5 respectively disposed on the two end portions of the trunnion 6 (that is, in a direction where the extensions of the center axes of the pivot shafts 5, 5 and the extension of the center axis of the circular hole 15 are perpendicular to each other). And, on the portion of the trunnion 6 that is present inside the circular hole 15, there is supported the displacement shaft 7. The displacement shaft 7 includes a support shaft portion 16 and a pivot shaft portion 17 which are arranged in parallel to each other but are offset from each other in the axes thereof. Of these two portions of the displacement shaft 7, the support shaft portion 16 is rotatably supported inside the circular hole 5 through a radial needle roller bearing 18. Also, on the periphery of the pivot shaft portion 17, there is rotatably supported the power roller 8 through another radial needle roller bearing 19.

Also, between the outer surface of the power roller 8 and the inner surface of the middle portion of the trunnion 6, there are interposed a thrust ball bearing 20 and a thrust needle roller bearing 21 in order starting from the outer surface of the power roller 8. Of these two bearings, the thrust ball bearing 20, while supporting a thrust load applied to the power roller 8, allows the power roller 8 to be rotated. The thrust ball bearing 20 is composed of a plurality of balls 22, 22, an annular-shaped retainer 23 for rollably holding the balls 22, 22, and an annular-shaped thrust ball bearing outer race 24. The inner race raceways of the respective thrust ball bearings 20 are formed on the outer surface of the power roller 8, while the outer race raceways of the respective thrust ball bearings 20 are formed on the inner surface of the thrust ball bearing outer race 24.

Also, the thrust needle roller bearing 21 is composed of a race 25, a retainer 26 and needle rollers 27, 27. The thrust needle roller bearing 21 is held by and between the inner surface of the trunnion 6 and the outer surface of the thrust ball bearing outer race 24, with the race 25 contacted with the inner surface of the trunnion 6. On the other hand, a cylindrical-shaped radial needle roller bearing outer race 28, which forms a part of the radial needle roller bearing 18, is fitted with and fixed to the inner side of the circular hole 15 with no play between them. And, in the thus fitted and fixed state, one end portion of the radial needle roller bearing outer race 28 is projected from the inner surface of the trunnion 6, and the race 25 and retainer 26, which respectively form the thrust needle roller bearing 21, are fitted with the outer surface of the projecting portion of the radial needle roller bearing outer race 28, thereby positioning the race 25 and retainer 26 with respect to the trunnion 6.

The thus structured thrust needle roller bearing 21, while supporting a thrust load applied to the thrust ball bearing outer race 24 from the power roller 8, allows the pivotal shaft portion 17 and thrust ball bearing outer race 24 to be swung about the support shaft portion 16. That is, in the half-toroidal-type continuously variable transmission, due to its transmission operation, variations in the torque to be transmitted and the elastic deformation of the component members of the half-toroidal-type continuously variable transmission, one or both of the input side and output side disks 2, 4 (FIGS. 7 and 8) are caused to shift in the axial direction, so that the displacement shaft 7 is slightly rotated about the support shaft portion 16. As a result of the slight rotation of the displacement shaft 7, the outer surface of the thrust ball bearing outer race 24 of the thrust ball bearing 20 and the inner surface of the trunnion 6 are shifted with respect to each other. Since the thrust needle roller bearing 21 is present between these outer and inner surfaces, such relative shift can be attained with only a small force. Therefore, there is required only a small force to change the inclination angles of the displacement shafts 7, 7 in the above-mentioned manner.

In the case of the trunnion 6 employed in the above-structured half-toroidal-type continuously variable transmission, a blank member formed of metal having high rigidity such a carbon steel is forged to be worked into a given shape and, after then, the required portions of the thus worked member are cut or ground for finishing. Of the respective portions of the thus worked trunnion 6, the circular circle 15 for assembly of the radial needle roller bearing 18 and a flat surface 29 for additional attachment of the thrust needle roller bearing 21 are respectively formed by a cutting operation using a machining center. For example, to machine the flat surface 29, with a rotation tool pressed against the inner surface middle portion of the trunnion 6 to be formed as the flat surface 29, the rotation tool may be rotated, with the result that the flat surface 29 can be worked. In a conventional machining operation, the cutting operation of the flat surface 29 is carried out separately from the drilling and finishing cutting operations of the circular hole 15. That is, after one of the flat surface 29 and circular hole 15 is worked by a machine tool, the trunnion 6 is once removed from the machine tool and is then set in a second machine tool, and the other of the flat surface 29 and circular hole 15 is then machined by the second machine tool.

To work the trunnion 6 for the half-toroidal-type continuously variable transmission with high efficiency and high accuracy, preferably, the flat surface 29 and circular hole 15 may be worked in one step which eliminates the need to remove the trunnion 6 from one machine tool and set the trunnion 6 in another machine tool.

SUMMARY OF THE INVENTION

The present invention aims at eliminating the above-mentioned drawbacks found in the conventional trunnion for use in a half-toroidal-type continuously variable transmission. Accordingly, it is an object of the invention to provide a trunnion for use in a half-toroidal-type continuously variable transmission and a method for working such trunnion.

In attaining the above object, according to one aspect of the invention, there is provided a trunnion of a half-toroidal-type continuously variable transmission, comprising: a middle portion having a flat surface on an inner surface thereof; and a pair of pivot shafts respectively disposed on the both end portions of the trunnion and being concentric with each other. A circular hole is formed in a art of the flat surface, with one end thereof opened. In the flat surface, there are formed stepped surfaces in the boundary portions between the peripheral edge portions of the flat surface and the remaining portion thereof, and the stepped surfaces respectively define partially tubular surfaces having a single center axis. The single center axis of the partially tubular surfaces is located at a position offset from a center axis of the circular hole in a direction in which the pair of pivot shafts are arranged.

According to a second aspect of the invention, there is provided a method for working a trunnion for a half-toroidal-type continuously variable transmission. The trunnion comprises: a middle portion having a flat surface formed on an inner surface thereof; and a pair of pivot shafts respectively disposed on the two end portions of the trunnion and being concentric with each other. A circular hole is formed in a part of said flat surface, with one end thereof opened. In the flat surface, there are formed stepped surfaces in the boundary portions between the peripheral edge portions of the flat surface and the remaining portion thereof, and the stepped surfaces respectively define partially tubular surfaces having a single center axis. The single center axis of the partially tubular surfaces is located at a position offset from a center axis of said circular hole in a direction in which said pair of pivot shafts are arranged. The method, comprises the steps of: holding the trunnion by a chuck supported on the leading end portion of a spindle of a machine tool performing a cutting operation in such a manner that the center axis of one of the circular hole and the partially tubular surfaces is coincident with or parallel to the center axis of the spindle; working one of the circular hole, the partially tubular surfaces and the flat surface of the held trunnion, while rotating the spindle; moving the chuck in a direction which is perpendicular to the center axis of the spindle and is parallel with the arranged direction of the pivot shafts of the trunnion; and, working the other of the circular hole, the partially tubular surfaces and the flat surface of the trunnion, while rotating the spindle.

In a trunnion for a half-toroidal-type continuously variable transmission and a method for working such trunnion structured in the above-mentioned manner according to the invention, while the trunnion remains held on and by the same chuck, the circular hole and partially tubular surfaces as well as the flat surface can be worked, thereby being able to enhance the working efficiency of the trunnion. This not only can reduce the manufacturing cost of the trunnion but also can enhance the shape and dimension accuracy of the trunnion such as the perpendicularity between the circular hole and flat surface.

DETAILED DESCRIPTION OF THE PREFERRED EMBODIMENTS

Figure 1:
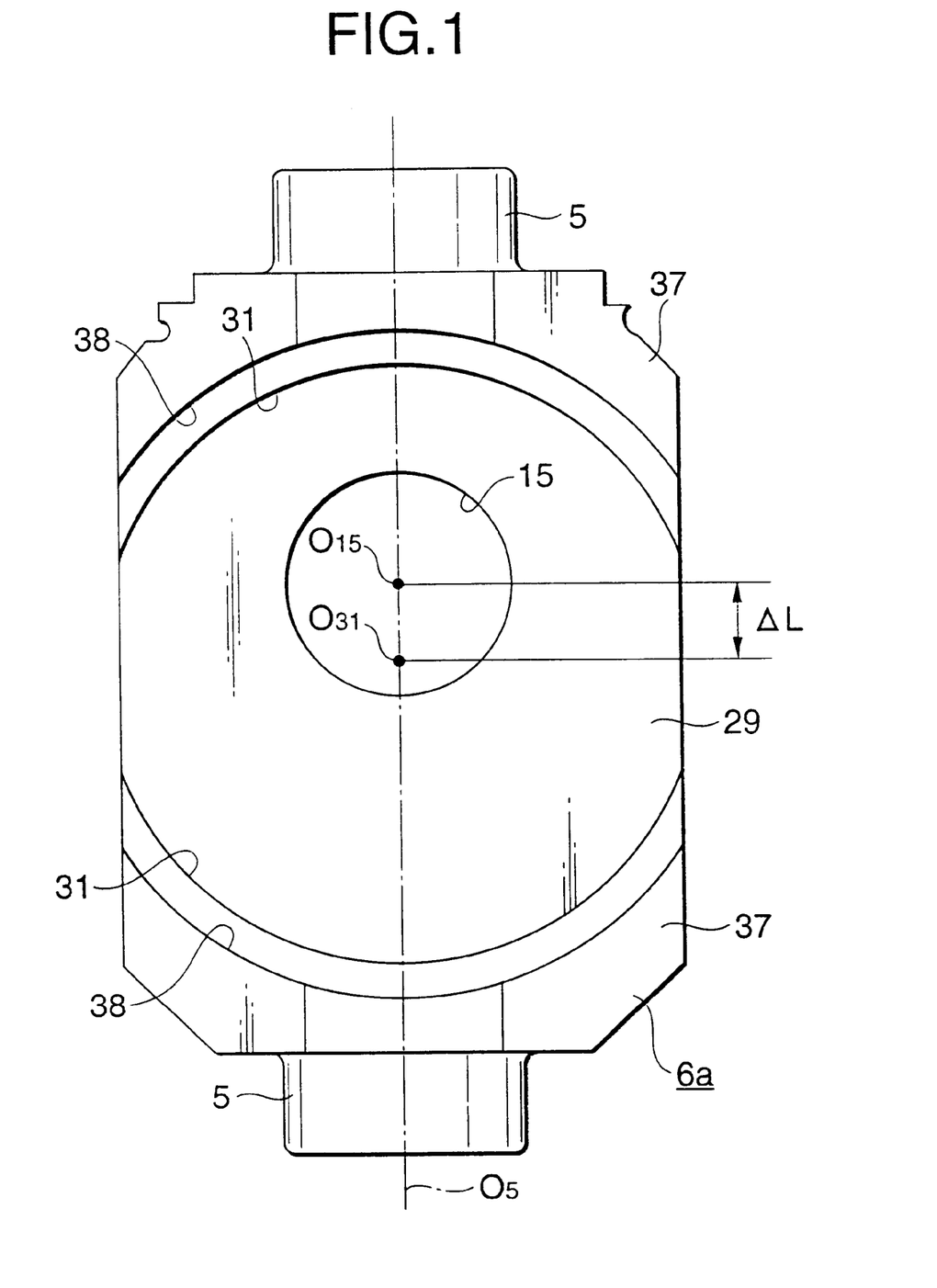
FIG. 1 is a schematic view of a trunnion used in an example of a mode for carrying out the invention, showing a state when the trunnion is viewed from the inner surface side thereof.
Figure 2:
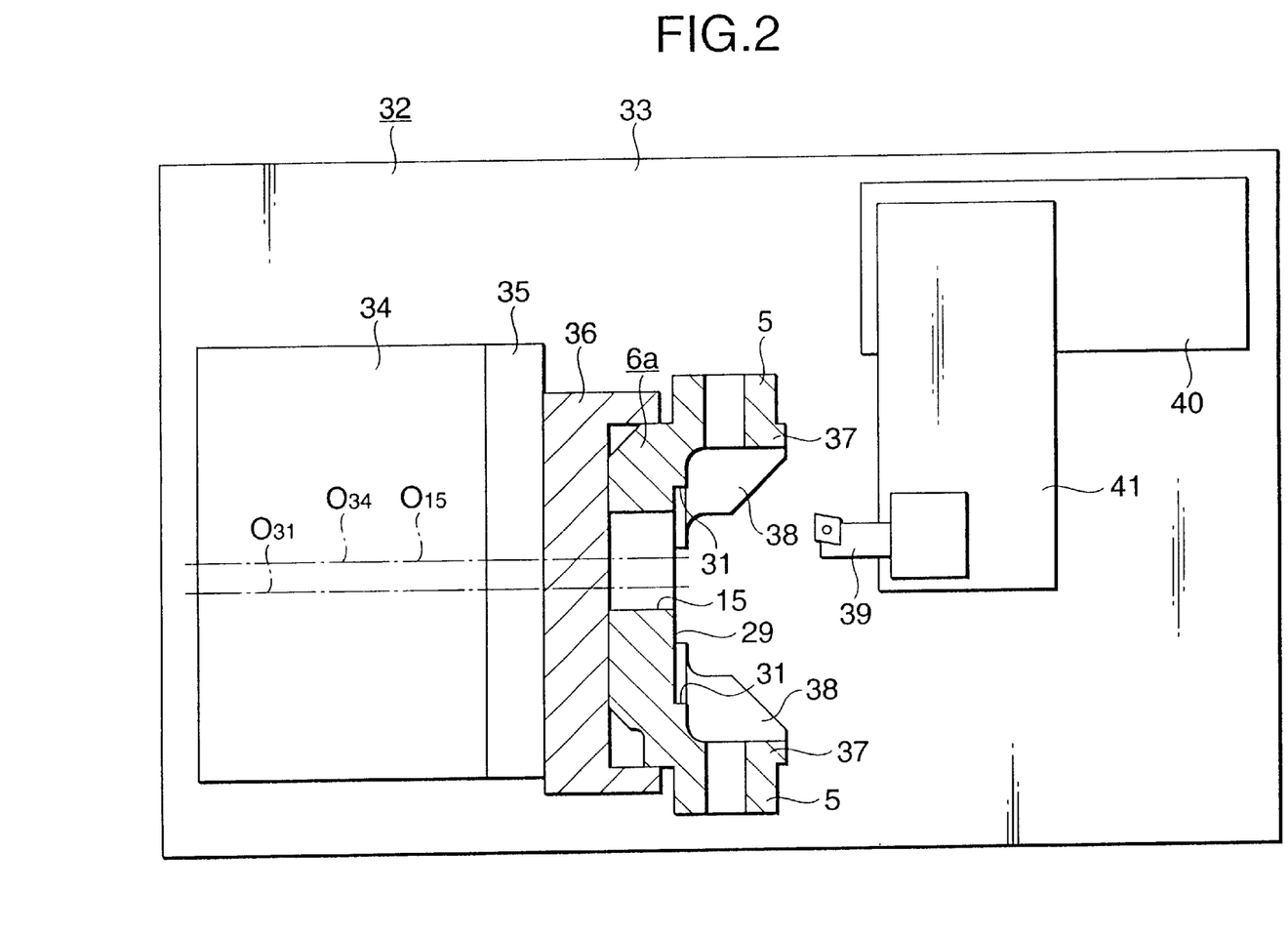
FIG. 2 is a plan view of a structure employed by a working method according to the invention, showing a state thereof for working a circular hole in the trunnion according to the present working method.
Figure 3:
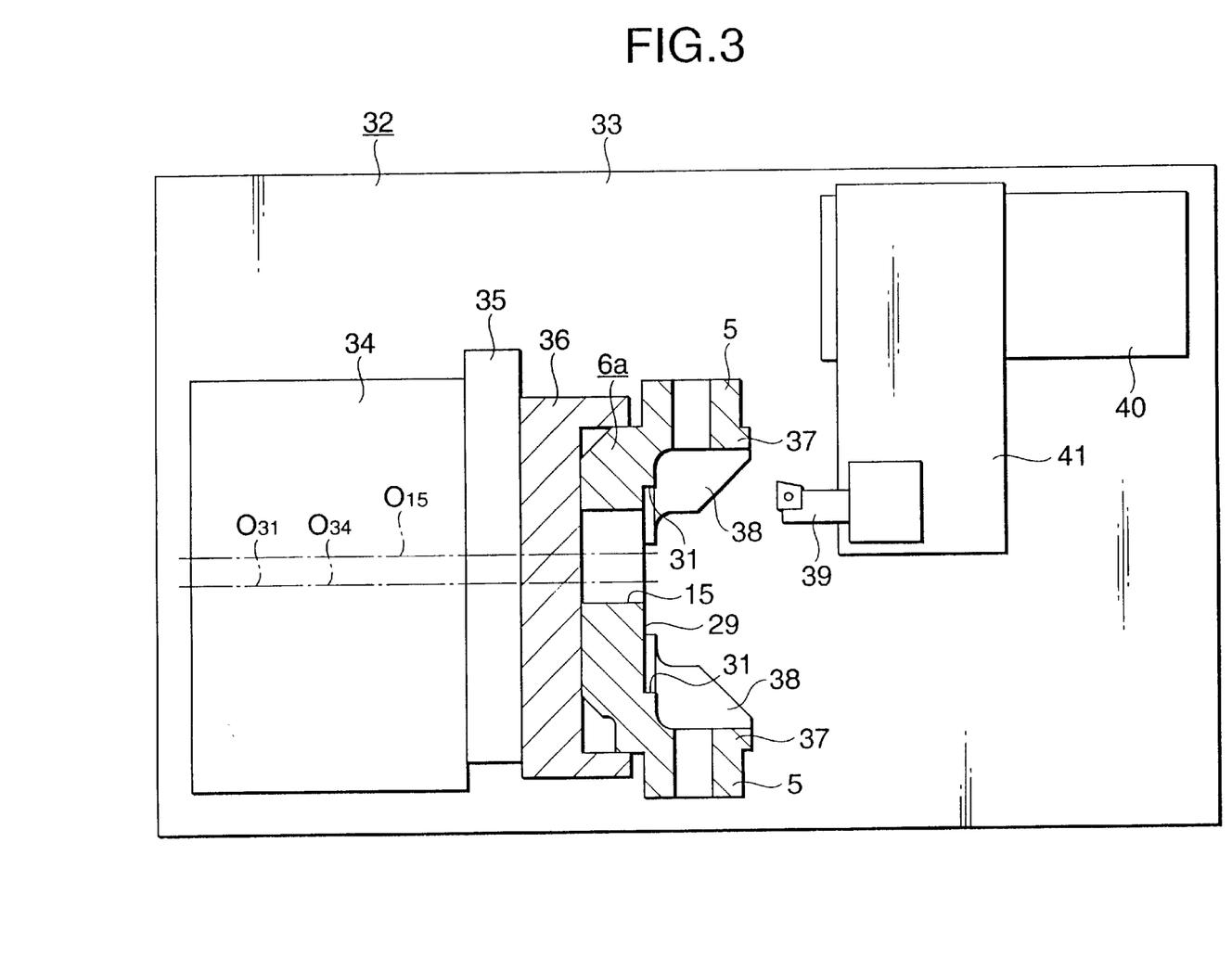
FIG. 3 is a plan view similar to FIG. 2; showing a state for cutting or working a flat surface.

Now, FIGS. 1 to 3 show an example of a mode for carrying out the invention. At first, FIG. 1 shows a trunnion 6a according to the invention. The present trunnion 6a, similarly to the conventional trunnion 6 shown in FIG. 9, includes a pair of pivot shafts 5, 5 respectively formed in the two end portions thereof so as to be concentric with each other, a flat surface 29 formed in the inner surface of the middle portion thereof, and a circular hole 15 formed in a part of the flat surface 29 in such a manner that one end of the circular hole 15 is opened. Especially, in the case of the present trunnion 6a, stepped surfaces 31, 31 respectively formed in the boundary portions between the peripheral edge portions of the flat surface 29 and the remaining portions thereof as well as the inner surfaces 38, 38 of a pair of bent portions 37, 37, which are respectively formed in the longitudinal-direction (in FIG. 2, in the vertical direction) two end portions of the trunnion 6a so as to allow the pair of pivot shafts 5, 5 to be mounted on the trunnion 6a, are respectively partially tubular surfaces, having a single center axis $O_{31}$. And, the center axis $O_{31}$ of the stepped surfaces 31, 31 and inner surfaces 38, 38, which are respectively formed as the partially tubular surfaces, exists at a position offset in the arranged direction of the pivot shafts 5, 5 (in FIG. 1, in the vertical direction) with respect to the center axis $O_{15}$ of the circular hole 15. In other words, the center axis $O_{31}$ of the stepped surfaces 31, 31 and the inner surfaces 38, 38 and the center axis $O_{15}$ of the circular hole 15 are not coincident with each other but they are respectively perpendicular to the center axis $O_5$ of the two pivot shafts 5, 5.

Next, FIGS. 2 and 3 show a state in which the flat surface 29 and circular hole 15 of the above-structured trunnion 6a are machined by a machine tool 32 which is designed to carry out a cutting operation. The machine tool 32 is structured such that a chuck 36 is mounted through a slider 35 on the leading end face (in FIGS. 2 and 3, the right end face) of a rotating spindle 34 above a base table 33. The slider 35 is movable in a direction perpendicular to the rotation axis of the spindle 33. And, the chuck 36 can hold the trunnion 6a which is a work to be machined. On the other hand, on the upper surface of the base table 33, there is supported a cutting tool 39 in such a manner that the cutting tool 39 can be moved parallel to the upper surface of the base table 33 as well as in a two-dimensional direction by a pair of moving table 40, 41 which are disposed so as to be movable in directions at right angles to each other.

An operation to work the stepped surfaces 31, 31, inner surfaces 38, 38 and circular hole 15 of the trunnion 6a is executed using the above-structured machine tool 32 in the following manner.

At first, the trunnion 6a is held on and by the chuck 36 supported on the leading end portion of the spindle 34 in such a manner that the center axis $O_{31}$ of the stepped surfaces 31, 31 and inner surfaces 38, 38 and the center axis $O_{15}$ of the circular hole 15 are coincident with or parallel to the center axis $O_{34}$ of the spindle 34. In this state, the slider 35, as shown in FIG. 2, is shifted to one end side (in FIG. 2, the lower end side) thereof to thereby make the center axis $O_{15}$ of the circular hole 15 to be worked coincide with the center axis $O_{34}$ of the spindle 34. And, while rotating the spindle 34, the cutting tool 39 is butted against the middle portion of the trunnion 6a to thereby machine the inner surface of the circular hole 15 for finishing.

Next, as shown in FIG. 3, the slider 35 is shifted to the other end side (in FIG. 3, the upper end side) thereof to thereby make the center axis $O_{31}$ of the stepped surfaces 31, 31 and inner surfaces 38, 38 to be cut coincide with the center axis $O_{34}$ of the spindle 34. And, while rotating the spindle 34, the cutting tool 39 is butted against the stepped surfaces 31, 31 and inner surfaces 38, 38 as well as against the flat surface 29 surrounded by the stepped surfaces 31, 31 and inner surfaces 38, 38 to thereby work the respective surfaces 31, 38 and 29.

Thus, in the above-structured trunnion for a half-toroidal-type continuously variable transmission according to the invention, and a method for working such trunnion, while the trunnion 6a remains held on and by the same chuck 36, the circular hole 15, the partially tubular surfaces forming the stepped surfaces 31, 31 and inner surfaces 38, 38, and the flat surface 29 can be worked. Thanks to this, to work the respective surfaces, an operation to mount the trunnion 6a onto the chuck 36 and remove the trunnion 6a from the chuck 36 may be carried out only once, which can enhance the efficiency of the working operation of the trunnion 6a and thus can reduce the manufacturing cost of the trunnion 6a. Also, this can reduce the occurrence of the errors that could be caused by repeating the mounting and removing operation of the trunnion 6a with respect to the chuck 36, which can enhance the accuracy of the shape and dimensions of the trunnion 6a; for example, the accuracy of the mutual perpendicularity between the circular hole 15 and flat surface 29 can be enhanced.

By the way, to carry out the working method according to the invention with high efficiency, preferably, the slider 35 for supporting the chuck 36 on the spindle 34 may be structured in such a manner that the slider 35 can be shifted positively and quickly by an offset amount ΔL (FIG. 1) between the center axis $O_{31}$ of the stepped surfaces 31, 31, inner surfaces 38, 38 and the center axis $O_{15}$ of the circular hole 15. As the preferred structure of the slider 35, there can be used a first structure shown in FIGS. 4 and 5, or a second structure shown in FIG. 6.

Firstly, referring to the first structure of the slider 35, a slide plate 43 is held so as to be slidable with no play by and between a pair of guides 42, 42 which are respectively fixed at the two mutually opposite positions of the end face of the spindle 34 in the diameter direction thereof and each has an L-shaped cross section. Thus, the slide plate 43 is shiftable in a direction perpendicular to the arranged direction of the pair of guides 42, 42 (that is, in FIGS. 4 and 5, in the vertical direction). Also, in the shifting direction of the slide plate 43, at the two mutually opposite positions of the end face of the spindle 34 in the diameter direction thereof, there are fixed a pair of stoppers 44, 44, respectively. A distance $D_{44}$ between the two stoppers 44, 44 is set larger than a length $L_{43}$ of the slide plate 43 in the shifting direction thereof by the offset amount ΔL (that is, $D_{44}=L_{43}+ΔL$).

Also, in the leading end portion of the spindle 34, there is incorporated an actuator 45 and thus the slide plate 43 can be driven to shift in a direction perpendicular to the arranged direction of the pair of guides 42, 42 by the actuator 45. Further, on the front surface (in FIG. 4, on the right surface) of the slide plate 43, there are disposed not only a pair of work stoppers 46, 46 by which the pivot shafts 5, 5 disposed on the two end portions of the trunnion 6a can be secured with no play, but also a pair of hold pawls 47, 47 capable of holding and fixing the trunnion 6a from both sides.

When working the circular hole 15, the partially tubular surfaces respectively forming the stepped surfaces 31, 31 and inner surfaces 38, 38, and the flat surface 29, the trunnion 6a is held from both sides by the hold pawls 47, 47 while the pivot shafts 5, 5 are respectively secured to the work stoppers 46, 46. In this state, in case where the slide plate 43 is shifted down to the lower end side thereof in FIGS. 4 and 5 by the actuator 45, the center axis $O_{15}$ of the circular hole 15 to be worked is made to coincide with the center axis $O_{34}$ of the spindle 34. On the other hand, in case where the slide plate 43 is shifted up to the upper end side thereof in FIGS. 4 and 5 by the actuator 45, the center axis $O_{31}$ of the stepped surfaces 31, 31 and inner surfaces 38, 38 to be worked is made to coincide with the center axis $O_{34}$ of the spindle 34. By the way, FIGS. 4 and 5 show a state in which the center axis $O_{31}$ of the stepped surfaces 31, 31 and inner surfaces 38, 38 is coincident with the center axis $O_{34}$ of the spindle 34.

Figure 4:
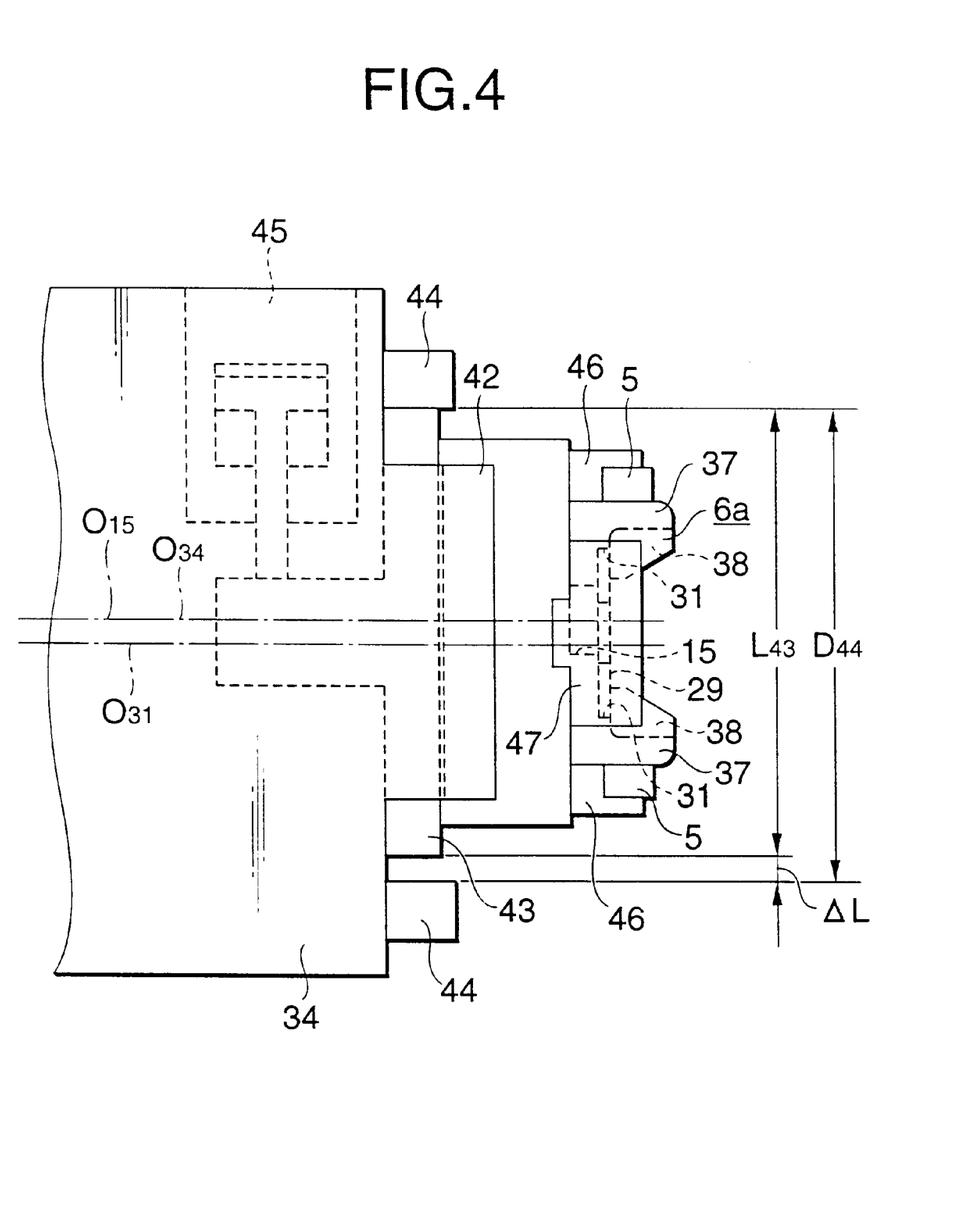
FIG. 4 is a side view of a first structure of a slider for supporting a trunnion in a freely shiftable manner.
Figure 5:
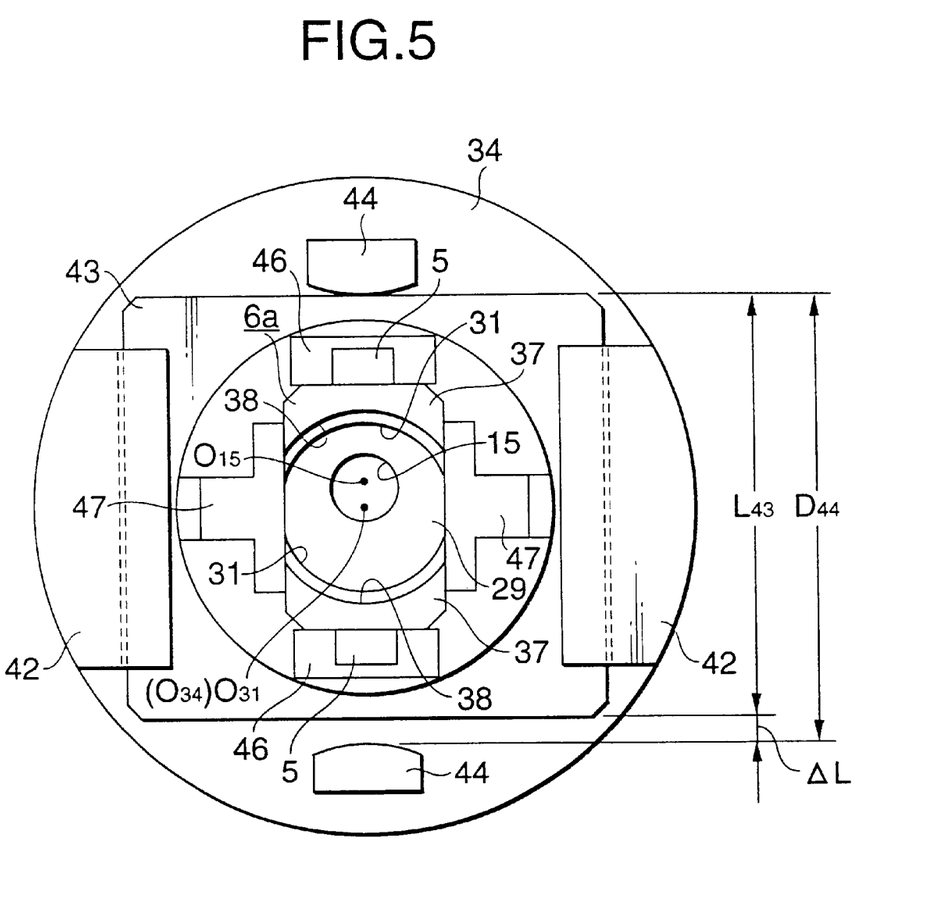
FIG. 5 is a view of the slider, showing a state thereof when viewed from the right of FIG. 4.

In the case of the first structure of the slider shown in FIGS. 4 and 5, the shift amount of the slide plate 43 is restricted to the offset amount ΔL by the pair of stoppers 44, 44. On the other hand, in the case of the second structure of the slide shown in FIG. 6, on the end face of the chuck 36a, there is disposed an actuator 45a whose stroke is the offset amount ΔL. And, the trunnion 6a can be driven to directly shift in the axial direction of the pivot shafts 5, 5 by the actuator 45a. In a state that the trunnion 6a is shifted to one end side (in FIG. 6, the lower end side) of the stroke of the actuator 45a, the center axis $O_{15}$ of the circular hole 15 to be worked is made to coincide with the center axis $O_{34}$ of the spindle 34. On the other hand, in case where the slide plate 43 is shifted to the other end side (in FIG. 6, the upper end side) of the stroke of the actuator 45a, the center axis $O_{31}$ of the stepped surfaces 31, 31 and inner surfaces 38, 38 to be worked is made to coincide with the center axis $O_{34}$ of the spindle 34. By the way, FIG. 6 shows a state in which the center axis $O_{31}$ of the stepped surfaces 31, 31 and inner surfaces 38, 38 is coincident with the center axis $O_{34}$ of the spindle 34.

By the way, when enforcing the working method according to the invention, as it is, the center of gravity of the portions that include the trunnion 6a and rotate together with the chucks 36, 36a cannot be always positioned at the center axis $O_{34}$ of the spindle 34. And, in case where the spindle 34 is rotated at a high speed while the center of gravity is shifted from the center axis $O_{34}$ so much, there are generated vibrations, which deteriorates the working accuracy. In order to prevent the deterioration of the working accuracy due to the vibrations, in the working operation of the circular hole 15 which requires the high speed rotation of the spindle 34, preferably, the center of gravity may be positioned on the center axis $O_{34}$ of the spindle 34. When working the stepped surfaces 31, 31 and inner surfaces 38, 38, it is not necessary to increase the rotation speed of the spindle 34 so much and, therefore, even in case where the center of gravity is shifted from the center axis $O_{34}$ to a certain degree, generation of harmful vibrations can be minimized and thus sufficient working accuracy can be secured.

Figure 6:
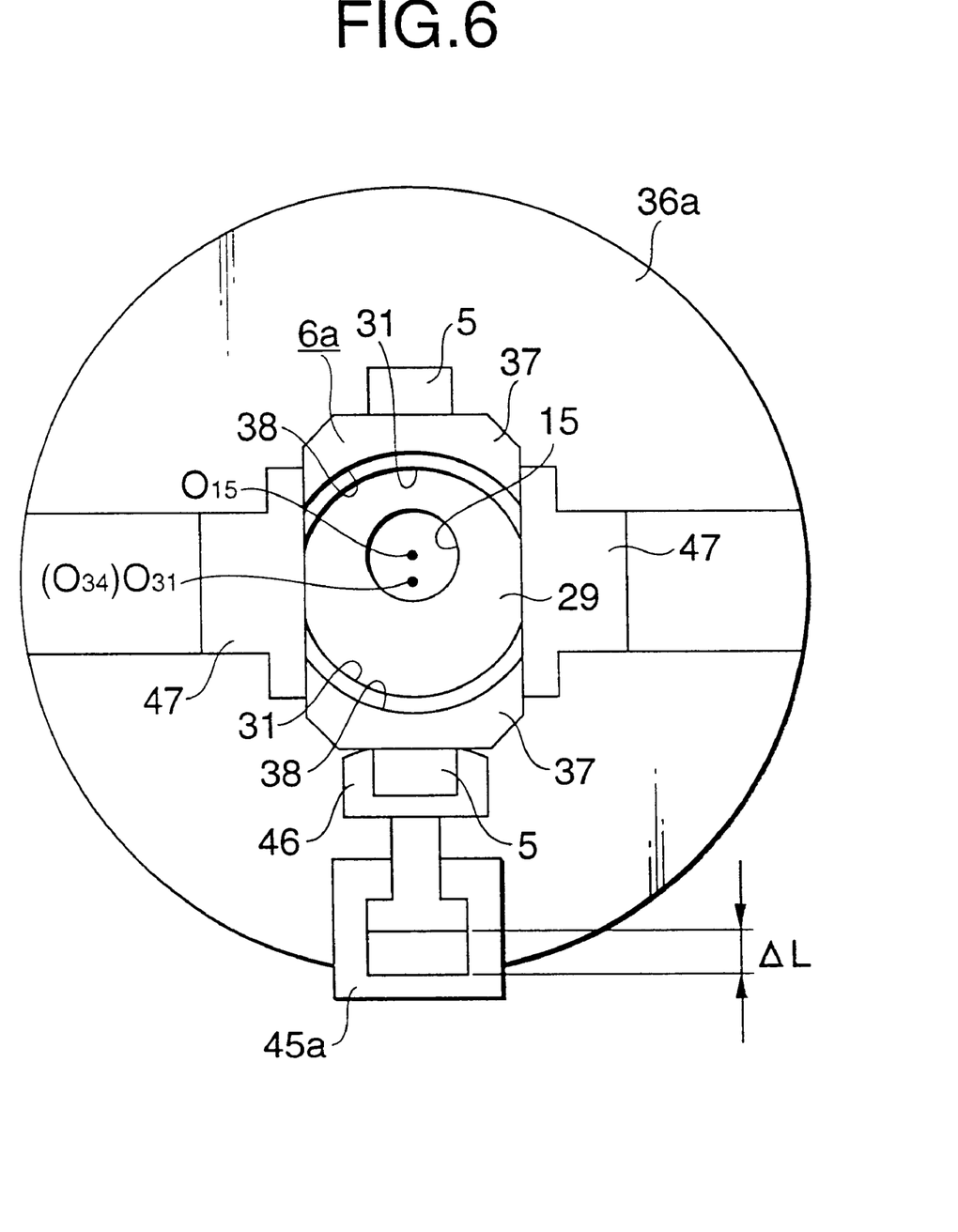
FIG. 6 is a side view of a second structure of a slider for supporting a trunnion in a freely shiftable manner.

When the above-mentioned vibrations occurring in the working operation are taken into consideration, as the structure of the slider, the second structure shown in FIG. 6 is preferred because the mass of the portion that is rotated while it is offset from the center axis $O_{34}$ of the spindle 34 can be minimized. However, in the case of the second structure shown in FIG. 6, when working the circular hole 15 and when cutting the stepped surfaces 31, 31 and inner surfaces 38, 38, holding of the trunnion 6a by the hold pawls 47, 47 as well as removal of such holding must be carried out and, therefore, from the viewpoint of the holding accuracy, there is a possibility that the working accuracy can be deteriorated.

On the other hand, in the case of the first structure shown in FIGS. 4 and 5, while the trunnion 6a remains held by the hold pawls 47, 47, the circular hole 15 as well as the stepped surfaces 31, 31 and inner surfaces 38, 38 can be worked. Therefore, in case where the vibrations can be restricted, the first structure shown in FIGS. 4 and 5 is preferred from the viewpoint of securing the working accuracy. Especially, in case where there is disposed in the leading end portion of the spindle 34 a balance weight which shifts in the opposite direction to the slide plate 43 so that the center of gravity including the balance weight can always exist on the rotation center axis of the spindle 34, generation of the vibrations in the working operation can be prevented. That is, with use of such balance weight, the first structure shown in FIGS. 4 and 5 can gain an outstanding advantage over the second structure shown in FIG. 6.

Since a trunnion for a half-toroidal-type continuously variable transmission and a method for working such trunnion according to the invention are structured and operate in the above-mentioned manner, the invention can work the trunnion for a half-toroidal-type continuously variable transmission with high efficiency and with high accuracy, thereby being able to contribute to the realization of a half-toroidal-type continuously variable transmission which can be manufactured at a low cost and can provide high performance.

While only certain embodiments of the invention have been specifically described herein, it will apparent that numerous modifications may be made thereto without departing from the spirit and scope of the invention.

What is claimed is:

1. A trunnion of a half-toroidal continuously variable transmission, comprising:

a middle portion having a flat surface on an inner surface thereof; and a pair of pivot shafts respectively disposed on opposite end portions of said trunnion and being concentric with each other, wherein a circular hole is formed in a part of said flat surface, with one end thereof opened, wherein, in said flat surface, there are formed stepped surfaces in the boundary portions between the peripheral edge portions of said flat surface and the remaining portion thereof, said stepped surfaces respectively define partially tubular surfaces having a single center axis, and wherein said single center axis of said partially tubular surfaces is located at a position offset from a center axis of said circular hole in a direction in which said pair of pivot shafts are arranged.

2. A trunnion for a half-toroidal continuously variable transmission according to claim 1, further including:

a pair of arcuate portions respectively formed in opposite end portions of said trunnion in the longitudinal direction thereof, wherein inner surfaces of said pair of arcuate portions respectively define partially tubular surfaces having the same center axis as said stepped surfaces of said flat surface.

3. A trunnion for a half-toroidal continuously variable transmission according to claim 1, wherein the center axis of said stepped surfaces of said flat surface and said inner surfaces of said arcuate portions and the center axis of said circular hole are respectively perpendicular to the center axis of said pair of pivot shafts.

4. A trunnion for half-toroidal continuously variable transmission according to claim 1, wherein said circular hole and said partially tubular surfaces are perpendicular to said flat surfaces.

5. A trunnion for a half-toridial continuously variable transmission according to claim 1, wherein said circular hole is a through hole.

6. A trunnion for a half-toroidal continuously variable transmission, comprising:

a middle portion having a flat surface formed in an inner surface thereof, for mounting thereon thrust bearings, said thrust bearings allowing said power rollers forming a part of said half-toroidal continuously variable transmission to be swingingly shifted, while supporting a thrust load applied to power rollers; and a pair of pivot shafts respectively disposed on opposite end portions of said trunnion and being concentric with each other, for supporting said power rollers in such a manner as to be swingingly shiftable and rotatable, wherein a circular hole is formed in part of said flat surface, with one end thereof opened, wherein, in said flat surface, there are formed stepped surfaces in the boundary portions between the peripheral edge portions of said flat surface and the remaining portion thereof, said stepped surfaces respectively define partially tubular surfaces having a single center axis, and wherein said single center axis of said partially tubular surfaces is located at a position offset from a center axis of said circular hole in a direction in which said pair of pivot shafts are arranged.

\* \* \* \* \*